US008588413B1

(12) United States Patent
Kalbag et al.

(10) Patent No.: US 8,588,413 B1
(45) Date of Patent: Nov. 19, 2013

(54) ENABLING SEAMLESS ACCESS TO A WI-FI NETWORK

(75) Inventors: Rohit Satish Kalbag, Bridgewater, NJ (US); Robert Martin Ephraim, Bridgewater, NJ (US); Ben-Ren Chen, Northboro, MA (US)

(73) Assignee: Cellco Partnership, Basking Ridge, NJ (US)

( * ) Notice: Subject to any disclaimer, the term of this patent is extended or adjusted under 35 U.S.C. 154(b) by 437 days.

(21) Appl. No.: 12/582,189

(22) Filed: Oct. 20, 2009

(51) Int. Cl.
*H04L 9/00* (2006.01)
(52) U.S. Cl.
USPC .............. 380/46; 713/155; 713/168; 713/185
(58) Field of Classification Search
USPC ............................ 380/46; 713/155, 168, 185
See application file for complete search history.

(56) References Cited

U.S. PATENT DOCUMENTS

| 7,920,531 | B2* | 4/2011 | Gupta et al. ................ 370/338 |
| 8,245,039 | B2* | 8/2012 | Jones ............................ 713/168 |
| 2005/0114680 | A1* | 5/2005 | Chinnaswamy et al. ..... 713/185 |
| 2005/0144439 | A1* | 6/2005 | Park et al. .................... 713/155 |
| 2007/0064647 | A1* | 3/2007 | Prasad ........................... 370/331 |
| 2007/0073817 | A1* | 3/2007 | Gorty ............................ 709/206 |
| 2007/0124490 | A1* | 5/2007 | Kalavade et al. ............. 709/230 |
| 2007/0169171 | A1* | 7/2007 | Kumar et al. ..................... 726/2 |
| 2009/0104892 | A1* | 4/2009 | Jones et al. ................. 455/412.1 |
| 2009/0109941 | A1* | 4/2009 | Carter .......................... 370/338 |
| 2009/0172775 | A1* | 7/2009 | Mardikar et al. ................ 726/2 |
| 2009/0204815 | A1* | 8/2009 | Dennis et al. ................. 713/168 |
| 2009/0327825 | A1* | 12/2009 | Natsuno et al. ............... 714/748 |
| 2009/0328165 | A1* | 12/2009 | Cook et al. ........................ 726/6 |
| 2010/0017603 | A1* | 1/2010 | Jones ............................. 713/168 |
| 2010/0246486 | A1* | 9/2010 | Lin et al. ....................... 370/328 |

\* cited by examiner

*Primary Examiner* — Beemnet Dada
*Assistant Examiner* — Sayed Beheshti Shirazi (57) ABSTRACT

A disclosed method for enabling a seamless authenticated access to an Aggregator's Wi-Fi network includes steps of receiving a request to establish a data session from a mobile device and at a public mobile service provider network, authenticating the mobile device in response to the request to establish the data session, and establishing the data session upon successful authentication. The method further includes steps of receiving an activation key associated with the mobile device from the mobile device and at the public mobile service provider network and recording the activation key against an identification of the mobile device such as a Mobile Directory Number assigned to the mobile device. The activation key is used to generate a password, which is used to authenticate the mobile device request to access the Aggregator's Wi-Fi network.

22 Claims, 5 Drawing Sheets

ENABLING SEAMLESS ACCESS TO A WI-FI NETWORK

TECHNICAL FIELD

This disclosure relates to methods and systems for enabling a mobile device to seamlessly authenticate access to a Wi-Fi network of one network based on creation and synchronization of keys with another network to which the mobile device has authorized access. In particular examples, this disclosure relates to methods and systems for enabling a mobile device to automatically generate a password; synchronize the generated password with an Authentication, Authorization, Accounting ("AAA") server of a public mobile service provider network utilizing EVDO/1X data channel; and subsequently utilize the password to gain access to a Wi-Fi type wireless network.

BACKGROUND

Wi-Fi aggregation service providers, such as, for example, Boingo Wireless or iPass sell their Wi-Fi aggregation services to public mobile network service providers, such as, for example Verizon Wireless™. The users subscribe to service from the mobile network service provider but may roam into and receive service from an aggregator served Wi-Fi hotspot. The customer service agreement still runs between the user and the network service provider, but there is a roaming agreement or other financial arrangement between the provider and the aggregator server for servicing the roaming users. In such a scenario, the aggregator server expects the mobile network service provider to authorize and authenticate their subscriber for Wi-Fi service utilizing a username and password check. Generally, separate Wi-Fi credentials (e.g., username and password) are used for the Wi-Fi service; and the customer is expected to enter these credentials in the Wi-Fi connection manager client residing on the mobile device being used, at least once.

Requiring the customer to enter the username and password inconveniences the customer and causes additional work for various support mechanisms (to retrieve, change, reset the password). Furthermore, each time the customer changes devices, this same process of entering username and password should be repeated because the new device does not have the username and password for Wi-Fi access registered therein. Other weaknesses in the current system allow the customer to share the password or not use a strong enough password, which can lead to theft of service.

As such, there is need for methods and systems that automate the process of authorized Wi-Fi access, increase security, and minimize customer and customer care intervention, for customers of mobile network service providers.

SUMMARY

In one general aspect, the instant application describes a method for enabling a seamless authenticated access to an Aggregator's Wi-Fi network by automatic generation and synchronization of keys with the public mobile service provider network. The method includes steps of receiving a request to establish a data session from a mobile device and at a public mobile service provider network, authenticating the mobile device in response to the request to establish the data session, and establishing the data session upon successful authentication. The method further includes steps of receiving an activation key associated with the mobile device from the mobile device and at the public mobile service provider network and recording, at the public mobile service provider network, the activation key against an identification of the mobile device. The activation key is used to generate a password for authenticating the mobile device for access to the Aggregator's Wi-Fi network. The method also includes the steps of receiving a request to access the Aggregator's Wi-Fi network from the mobile device and through the Aggregator's Wi-Fi network and using the password to authenticate the mobile device request to access the Aggregator's Wi-Fi network.

Implementations of the above general aspect may include one or more of the following features. The step of receiving the request to access the Wi-Fi network may include automatically receiving a password from the mobile device. The step of using the password to authenticate the mobile device may include comparing the password generated by the public mobile service provider network with the password received from the mobile device to determine whether they match; and enabling the mobile device to access the Aggregator's Wi-Fi network upon determining that the passwords in the comparing step match each other.

The method may further include steps of receiving, from the mobile device and at the public mobile service provider network, a disconnection request to disconnect the established data session upon recordation of the activation key against the identification of the mobile device. The identification of the mobile device may include a Mobile Directory Number ("MDN") associated with the mobile device. The step of receiving the request to establish the data session may include receiving the request to establish the data session when the mobile device selects to activate its Wi-Fi access client software.

The method may further include a step of receiving, prior to the step of receiving the activation key from the mobile device, an inquiry as to whether the public mobile service provider network already includes an activation key associated with the mobile device. Additionally, the method may include a step of informing the mobile device that the public mobile service provider network does not include an activation key associated with the mobile device prior to the step of receiving the activation key from the mobile device. The activation key may include a random number or a random alphanumeric string.

The method may further include steps of receiving, from the mobile device and at the public mobile service provider network, instructions to erase the activation key associated with the mobile device; authenticating, in response to the instructions to erase the activation key, an identity of a user of the mobile device or the mobile device; and erasing the activation key associated with the mobile device. The method may further include steps of receiving, from the mobile device and at the public mobile service provider network, a new activation key associated with the mobile device; and recording the new activation key against the identification of the mobile device.

The method may further include a step of determining whether the mobile device subscribes to Wi-Fi services at the public mobile service provider network based on the authentication information gathered during the establishment of the data session. The step of recording the activation key may include recording the activation key after determining that the mobile device subscribes to the Wi-Fi services. The step of receiving the activation key may include receiving an activation key that is randomly generated by the mobile device. The method may further include a step of disconnecting the data session associated with the mobile device. In this scenario, the step of receiving the request to access the Aggregator's Wi-Fi network from the mobile device includes receiving a request to access the Aggregator's Wi-Fi network after disconnecting the data session associated with the mobile device.

In another aspect, the instant application describes an article of manufacture comprising a computer-readable storage medium and a computer program for enabling a mobile device to automatically access a Wi-Fi network by automatic generation and synchronization of keys with a mobile service provider network, the computer program being embodied on, the computer-readable storage medium and including instructions that, when executed, cause the mobile device to: establish a data session with a server of a public mobile service provider network and determine whether the public mobile service provider network includes an activation key associated with the mobile device. Upon determination that the public mobile service provider does not include the activation key for the mobile device, send to the server an activation key for storage against an identification of the mobile device; record the activation key in the mobile device; and use the activation key to generate a password for authentication of access to the Wi-Fi network. The generated password is sent from the mobile device to the Wi-Fi network for authentication of access to the Wi-Fi network.

Implementations of the above general aspect may include one or more of the following features. For example, the server may accept the activation key only if the server can authenticate the mobile device by checking, for example, the mobile device's identity based on authentication the device went through to set up the data session on the public mobile service provider network. The instructions may cause the mobile device to send the request to establish the data session when the mobile device goes through first-time activation or when the mobile device attempts to connect to the Wi-Fi network but determines that a first-time activation flag is set. The first-time activation flag may indicate that the activation key for the mobile device is uninitialized. The activation key may be an alpha-numeric random string.

The mobile device may include a mobile phone or a laptop. The identification of the mobile device may include an MDN associated with the mobile device. The computer-readable medium may further include instructions to cause the mobile device to send the identification of the mobile device to the server as a username. The computer-readable medium may further include instructions to cause the mobile device to send to the server a disconnection request to disconnect the established data session upon recordation of the activation key. The computer-readable medium may further include instructions to cause the mobile device to automatically send the password along with a username to the server upon determination that the mobile device desires to access the Wi-Fi network.

The computer program may further include instructions to cause the mobile device to: send, from the mobile device and to the server, an instruction to erase the activation key associated with the mobile device; send, from the mobile device and to the server, a new activation key associated with the mobile device; and record the new activation key in the mobile device.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

In the following detailed description, numerous specific details are set forth by way of examples in order to provide a thorough understanding of the relevant teachings. However, the present teachings may be practiced without such details. In other instances, well-known methods, procedures, components, and circuitry have been described at a relatively high-level, without detail, in order to avoid unnecessarily obscuring aspects of the present teachings.

This disclosure describes systems and methods that automate the process of accessing a Wi-Fi network, leading to significant simplification of the process, increased security, and minimized customer and customer care intervention. In one implementation, the systems and methods enable the mobile device to generate a password; synchronize the generated password with an AAA server, and subsequently use the generated password to gain access to the Wi-Fi network.

First, the Wi-Fi access manager software causes the mobile device to establish a data session with a server of a public mobile service provider network. Then, the Wi-Fi access manager software determines whether the public mobile service provider network includes an activation key associated with the mobile device. Upon determination that the mobile service provider does not include the activation key for the mobile device, the Wi-Fi access manager software causes the mobile device to send to the server an activation key and to record the activation key in the mobile device. The server receives the activation key and records the activation key against the MDN associated with the mobile device. In this manner, both the server and the Wi-Fi access manager software can generate the same password from the activation key, which can be used to authenticate the mobile device access to the Wi-Fi network.

When attempting to access the Wi-Fi network, the Wi-Fi access manager software causes the mobile device to send the generated password to the Wi-Fi network to authenticate the access of the mobile device to the Wi-Fi network. The Wi-Fi network forwards the password to the server of the public mobile service provider network. The server checks the password against its own generated password for the particular mobile device, and since they are the same, authorizes access to the Wi-Fi network.

To illustrate one non-limiting example, the mobile device includes a laptop/PC equipped with a broadband wireless data device, such as an Evolution Data Only ("EVDO") communication device, for mobile communication via a public wide area network. The EVDO communication device supports access to Wi-Fi network. The mobile device may include a Wi-Fi adaptor. The mobile device enters a local hotspot zone at an airport, for example, and is instructed to access the Wi-Fi network provided of the local hotspot operator by the user. In this connection, the user launches the Wi-Fi access manager software installed on the mobile device.

Upon launch, the Wi-Fi access manager software determines whether the device is provisioned with the username and password to access the local wireless hotspot server. If so, the username and password are automatically forwarded to the local wireless hotspot server. If not, the Wi-Fi access manager software provisions the device with the username and password as described in more detail below.

The local wireless hotspot server recognizes that the mobile device is associated with the Wi-Fi aggregator server network and, as such, forwards the username and password to the Wi-Fi aggregator server. The local wireless hotspot server may glean this information from the username submitted by the mobile device. The username may include a phone number followed by a set of alpha-numeric digits that identifies the public mobile service provider for the mobile device. The alpha-numeric digits, for example, may identify the mobile service provider as Verizon Wireless™.

The password may be a mixture of several elements. The several elements may include device or subscriber information and the activation key, which may be hashed together to generate the password. The device or subscriber information may include one or more of Mobile Device Directory Number ("MDN"), Mobile Identification Number ("MIN"), Mobile Equipment Identifier ("MEID"), International Mobile Equipment Identity ("IMEI"), International Mobile Subscriber Identity ("IMSI"), and/or Electronic Serial Number ("ESN") associated with the mobile device or the EVDO device. With hashing there may be a low probability that two strings produce the same answer and it is difficult to determine the input to the hash, thereby making it difficult for hackers to generate the password.

The Wi-Fi aggregator server receives the username and password and gleans therefrom that the mobile device is a subscriber of the Verizon Wireless™ and forwards the same to the AAA server Verizon Wireless™ for authentication. In particular, the Wi-Fi aggregator server forwards the username and password to the AAA server to determine whether the mobile device is authorized to access the Wi-Fi network. The AAA server references an internal table to determine whether the username and password matches the username and password stored therein. The Wi-Fi access manager software in the mobile device may have previously synchronized the AAA server to include the same username and password as will be described in more detail below. Assuming that the AAA server includes the same username and password, the AAA server successfully authenticates the mobile device access and informs the Wi-Fi aggregator server of the same. The Wi-Fi aggregator server in turn informs the local wireless hotspot server. Thereafter, the local wireless hotspot server authorizes the mobile device for access to the Wi-Fi network.

Discussions of the following use-case scenarios more clearly identify how the various actors may interact with each other to generate a password; synchronize the generated password with the AAA server, and subsequently use the generated password to gain access to the Wi-Fi network.

The first use-case scenario describes how the Wi-Fi access manager software installed on a mobile device causes the mobile device to generate a password and synchronize the generated password with that generated by the AAA server, and to subsequently use the generated password to gain access to the Wi-Fi network. The second use-case scenario describes what would happen in a case of a mismatch between the activation key stored in the mobile device and the one stored in the AAA server. The third use-case scenario describes how to reset the activation key stored in the AAA server.

In the first scenario, the Wi-Fi access manager software causes the mobile device to set up an EVDO/1X data session with a self-provisioning gateway associated with the mobile service provider network to synchronize the password generated by the AAA server with that generated by the mobile device. The process of setting up an EVDO/1X data session may be triggered due to several events. For example, when the Wi-Fi access manager software goes through a first-time activation process in conjunction with the *228 activation process for the EVDO device, the EVDO/1X data session may be established. For another example, the EVDO/1X data session may be established upon the customer's request or when the Wi-Fi access manager software is instructed by the user to connect to a local wireless hotspot server and finds that a first-time activation flag is set. The first-time activation flag indicates that the activation key for the EVDO device is uninitialized.

In either case, the Wi-Fi access manager software causes the device to display the need to setup an EVDO/1X data session to the customer and to set up the EVDO/1X data session. Thereafter, the Wi-Fi access manager software generates an activation key and forwards the same to the server associated with the mobile service provider network. The server forwards the activation key to the AAA server. The AAA server records the activation key against the MDN associated with the EVDO device. Alternatively, the server may record the activation key against other device identifiers such as, for example, the ESN, MEID, and/or ISMI. For the sake of simplicity, in the instant application, the MDN is used as an exemplary identifier of the mobile device against which the activation key is registered.

The AAA server uses the activation key to generate a password used to authenticate the mobile device access to the Wi-Fi network. The mobile device stores the activation key, ESN/MEID in its local database and clears the first time activation flag for the EVDO device if not already cleared. The mobile device uses the activation key to generate a password used to authenticate the mobile device access to the Wi-Fi network. Since both the AAA server and the mobile device now have the same activation key, they use the same password generation algorithm; therefore they should generate the same password which can be used to authenticate the mobile device access request to the Wi-Fi network.

After synchronization, the Wi-Fi access manager software causes the mobile device to disconnect the EVDO/1X data session and if the trigger for this process had been a user attempting to access a local hotspot zone, the Wi-Fi access manger software causes the mobile device to retry to connect to the local hotspot zone using the username and the newly generated password. In this manner, the user can automatically access the Wi-Fi network without having to manually enter a username or password. Alternatively, the user can manually setup a username and a password prior to use of the Wi-Fi network. This first use-case scenario is described in more detail with respect to FIG. 2.

During subsequent uses, since the first-time activation flag is not set and the activation key mapping to the device is present in the local database, the Wi-Fi access manager software uses the activation key for the device to generate the password for the local hotspot zone authentication. The Wi-Fi access manager software causes the mobile device to forward the username and password to the local wireless hotspot server, which in turn forwards it to the Wi-Fi aggregator server. The Wi-Fi aggregator server requests that the AAA server authenticate the username and password. Since the AAA server of the public mobile service provider network includes the same activation key, it also generates the same password as the one generated by the mobile device. As such, the result of the comparison should be a match and the mobile device access request should be granted.

The second use-case scenario involves a mismatch between the activation key stored in the mobile device and the one stored in the AAA server. There might be some cases in which the EVDO device is used in multiple mobile devices so that the activation key in the Wi-Fi access manager software local database may not reflect the activation key in the AAA server. As the activation key of the Wi-Fi access manager is out of sync with the activation key of the AAA server, the authentication will likely fail. This should result in an error from the local wireless hotspot server. The Wi-Fi access manager software uses this error as an indication that the activation key may be out of sync, sets the first-time activation flag, and causes the mobile device to inform the customer that the EVDO/1X data session is needed for exchange of WI-FI credentials. This process will be described in more detail with respect to FIG. 3.

In the third use-case scenario, the user has a reason to invalidate a key stored in the AAA server. The user may feel that the credentials have been compromised and may want to reset the credentials. For example, if the user loses his mobile device, he may want to reset the credentials stored in the AAA server. This process is described in more detail with respect to FIG. 4.

With that introduction, it may be helpful now to consider specific example of a system in which these Wi-Fi network access techniques may be implemented.

Figure 1:
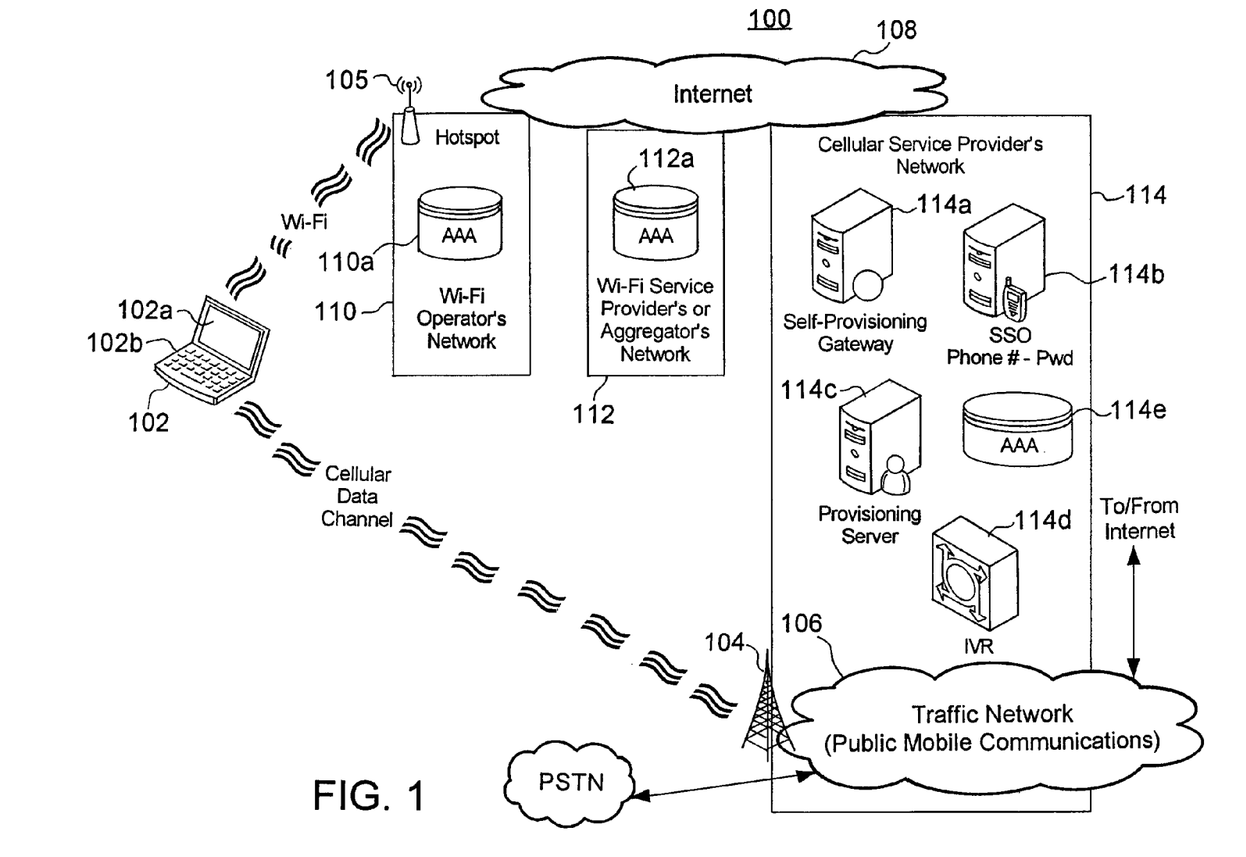
FIG. 1 illustrates a system for enabling a mobile device to seamlessly access a Wi-Fi network.

FIG. 1 illustrates a system 100 for enabling a mobile device to seamlessly access a Wi-Fi network. The system 100 includes a mobile device 102 having access to Internet 108 through various communication channels. In one example, the mobile device 102 may access Internet 108 through base station 104 and public mobile communications network 106. In another example, the mobile device 102 may access Internet 108 through a wireless access point type base station 105 and local wireless hotspot server 110.

The system 100 utilizes a client-server paradigm. Essentially, the mobile service provider network 114 provides selected services to devices of users that subscribe to receive such services. In one example, the service includes enabling the users (e.g., the user of the mobile device 102) to access a Wi-Fi network through the local wireless hotspot server 110 (e.g., when not operating via base station 104 and network 106). Although in FIG. 1 the mobile device 102 is a wireless terminal device, such as a laptop, it is understood that the mobile device 102 can be any other type of mobile terminal capable of remote access to the mobile service provider network 114. For example, the mobile device 102 may be a web enabled digital cellular telephone handset.

The mobile device 102 includes a display 102a for presentation of information to the user and a keyboard 102b or the like for user input of data and user selections. The mobile device 102 may also offer cursor control and selection type user input capabilities that allow a user to point-and-click on a displayed object, much like the capability offered with the display and mouse of a personal computer.

The mobile service provider network 114 uses various support items in different roles to operate or support operation of the network 114. In the example, the various support items include self-provisioning gateway 114a, a single sign-on ("SSO") server 114b, a provisioning server 114c, an interactive voice response ("IVR") 114d, and a AAA server 114e.

Each of these components is described in more detail below. The mobile service provider network 114 is connected for packet switched data communications via the public network now commonly known as Internet 108. The link of mobile service provider network 114 to Internet 108 may utilize any convenient fiber, wire or wireless transport technology providing sufficient data communication bandwidth to support the expected traffic from users of various client devices (e.g., laptop 102).

In one implementation, the system 100 enables the mobile device 102 to seamlessly access the Wi-Fi network offered by the local wireless hotspot server 110. To this end, the mobile device 102 includes a Wi-Fi adapter/transceiver, access manager software and an EVDO device; and the software enables the mobile device 102 to generate a password, synchronize the generated password with the one generated by the AAA server 114e via EVDO session, and subsequently use the generated password to gain access to the Wi-Fi network provided by the local wireless hotspot server 110.

To illustrate, assume that the mobile device 102 enters a local hotspot zone at an airport, for example, and is instructed to access the Wi-Fi network provided by the local wireless hotspot server 110. The user may launch the Wi-Fi access manager software installed on the mobile device 102. Alternatively, the Wi-Fi access manager software may be automatically launched upon detection of a Wi-Fi network. In either case, upon launch, the Wi-Fi access manager software determines whether the mobile device 102 is provisioned with the username and password to access the Wi-Fi network provided by the local wireless hotspot server 110. If so, the Wi-Fi access manager software causes the mobile device 102 to automatically forward the username and password to the local wireless hotspot server 110 for authentication. If not, the Wi-Fi access manager software provisions the mobile device 102 with the username and password as described in more detail below with respect to FIG. 2.

In either case, the local wireless hotspot server 110 recognizes that the mobile device 102 is associated with the Wi-Fi aggregator server 112 and, as such, forwards the username and password to the Wi-Fi aggregator server 112. The Wi-Fi aggregator server 112 is a proxy to the AAA server 114e, which stores the credentials for the user and authenticates the Wi-Fi access request from the user. Therefore, the Wi-Fi aggregator server 112 may not maintain the credentials to authenticate the user and may act as a proxy to the AAA server 114e for authenticating the Wi-Fi access request for mobile devices that subscribe to the mobile service provider network 114. However, the Wi-Fi aggregator server 112 may have its own customers and, as such, may use its internal AAA server 112a to authenticate their Wi-Fi access requests.

Similarly, the local wireless hotspot server 110 may also have its own customers and, as such, may use its internal AAA server 110a to authenticate their Wi-Fi access requests.

The local wireless hotspot server 110 recognizes that the mobile device 102 is associated with the Wi-Fi aggregator server 112 and, as such, forwards the username and password to the Wi-Fi aggregator server 112. The local wireless hotspot server 110 may glean this information from the username and/or the password submitted by the mobile device 102. In keeping with the previous example, the username may include a phone number followed by a set of alpha-numeric digits that identifies the service provider of the mobile device. The alpha-numeric digits may identify the mobile service provider as the Verizon Wireless™.

The password may be a mixture of several elements. The several elements may include a synchornizable element, the activation key, and the device or subscriber information.

These elements may be hashed together to generate the password. The synchornizable element may include, for example, date, time or a sequential counter. The device or subscriber information may include, for example, MDN, MIN, MEID, IMEI, IMSI, and/or ESN of the mobile device or the EVDO device. With hashing there may be a low probability that two string produce the same answer and difficult to determine the input to the hash, thereby making it difficult for hackers to generate the password.

The Wi-Fi aggregator server 112 receives the username and password and gleans therefrom that the mobile device 102 is a subscriber of the mobile service provider 114 (e.g., Verizon Wireless™). Therefore, the Wi-Fi aggregator server 112 forwards the same to the mobile service provider network 114 for authentication. In particular, the Wi-Fi aggregator server 112 forwards the username and password to the AAA server 114e to determine whether the mobile device 102 is authorized to access the Wi-Fi network.

The AAA server 114e references an internal table to determine whether the username and password matches the username and password stored therein. The Wi-Fi access manager software may have previously synchronized the username and password generated from the mobile device with the one stored in the AAA server 114e. This is described in more detail with respect to FIG. 2. Assuming that the AAA server 114e includes the same username and password, the AAA server 114e authenticates the mobile device access and informs the Wi-Fi aggregator server 112 of the same. The Wi-Fi aggregator server 112 in turn informs the local wireless hotspot server 110. Thereafter, the local wireless hotspot server 110 authorizes the mobile device 102 to access the Wi-Fi network.

As noted above, the mobile service provider network 114 includes the self-provisioning gateway 114a, the SSO 114b, the provisioning server 114c, the IVR 114d, and the AAA server 114e. The self-provisioning gateway 114a interacts with the Wi-Fi access manager software installed on the mobile device 102 to enable the Wi-Fi access manager to synchronize the password generated by the mobile device with the one generated and stored by the AAA server 114e. The SSO 114b is an MDN and password authentication server for single sign-on purposes. The provisioning server 114c provisions the activation key in the AAA server 114e and authenticates and authorizes the Wi-Fi access. The interactions of the foregoing components will be described in more detail with respect to FIGS. 2-4. The exemplary user-case scenarios are now described in detail by reference to the accompanying drawings.

Figure 2:
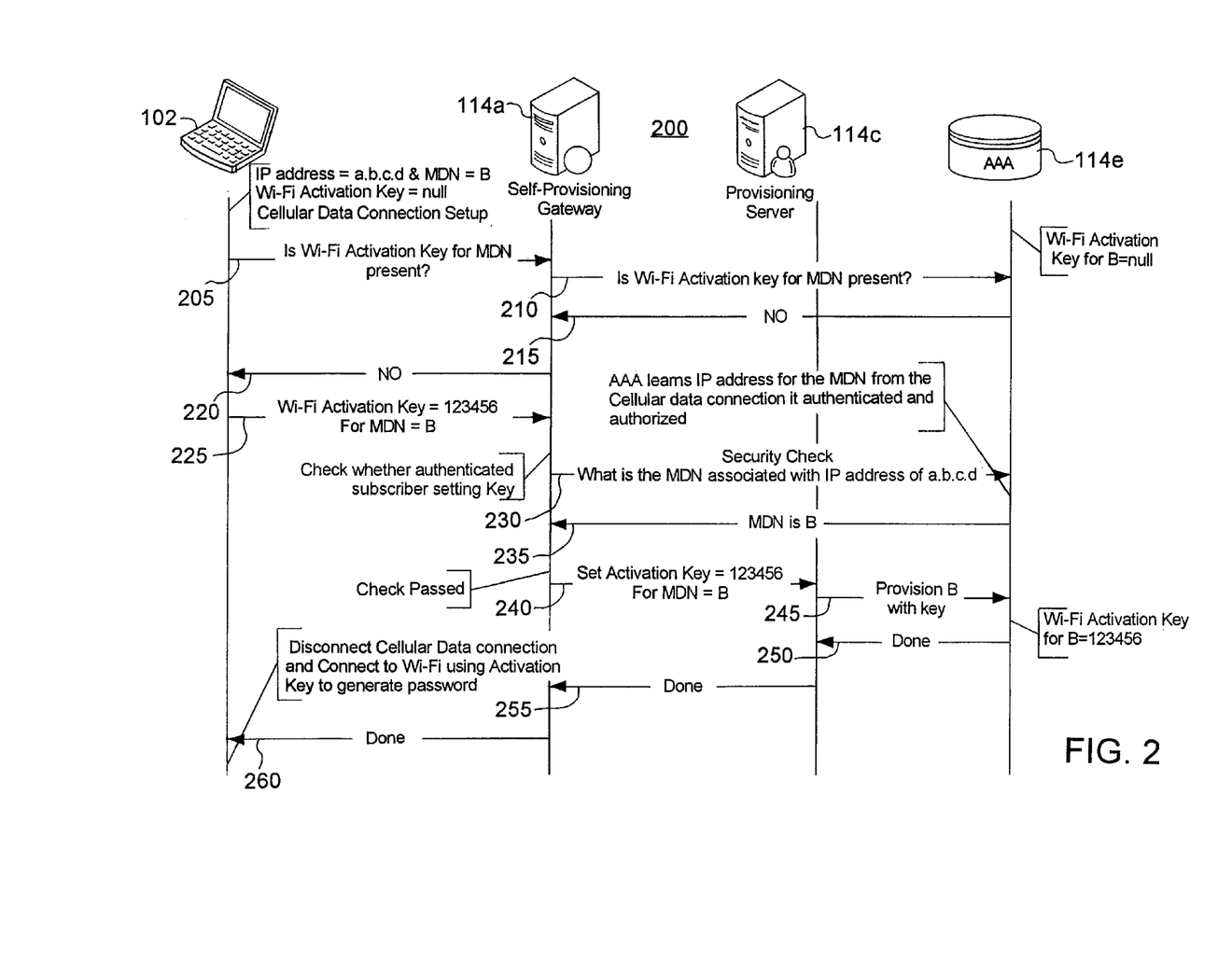
FIG. 2 illustrates an exemplary process for enabling Wi-Fi access manager software to synchronize the password generated and stored at a mobile device with the one generated and stored at a AAA server.

FIG. 2 illustrates an exemplary process 200 for enabling the Wi-Fi access manager software to synchronize the password generated and stored at the mobile device 102 with the one generated and stored at the AAA server 114e. The actors shown in FIG. 1 perform the steps of the process 200. In particular, the process 200 involves the mobile device 102, the self-provisioning gateway 114a, the provisioning server 114c, and the AAA server 114e.

The process 200 begins with the Wi-Fi access manager software recognizing the need to establish the EVDO/1X data session between the mobile device 102 and the mobile service provider network 114. This may be recognized when the Wi-Fi access manager software installed on the mobile device 102 goes through a first-time activation process in conjunction with the *228 activation process for the EVDO device, on demand from the customer, or when the Wi-Fi access manager software is instructed to connect to the local wireless hotspot server 110 and finds that the activation key for the EVDO device is uninitialized.

Moving forward, it is assumed that the Wi-Fi access manager is instructed to connect to the local wireless hotspot server 110 and that the activation key for the EVDO device is uninitialized. Consequently, the Wi-Fi access manager software causes the mobile device 102 to display the need to setup an EVDO/1X data session to the customer and steps up an EVDO/1X data session if it is possible to establish such a session. If EVDO/1X data coverage is available but a data session cannot be established, the customer may be informed to contact customer care and the user may be denied access to the Wi-Fi services offered by the local wireless hotspot server 110.

If the EVDO/1X data coverage is available and the data session can be established, the Wi-Fi access manager software causes the mobile device 102 to use https to query the self-provisioning gateway 114a to determine whether the AAA server 114e has an activation key associated with the mobile device 102 (step 205). The query may include the MDN and/or ESN/MEID of the mobile device 102. The self-provisioning gateway 114a queries the AAA server 114e and reports the result of this query to the Wi-Fi access manager software (steps 210, 215). The self-provisioning gateway 114a may query the AAA server 114e directly as shown or may query the AAA server 114e via the provisioning server 114c.

The AAA server 114e determines whether it includes an activation key for the mobile device 102. The AAA server 114e may store the activation key against the MDN or other identifications of the mobile device 102. As such, the AAA server 114e may be able to easily determine whether there is an activation key by referencing the MDN or the like of the mobile device 102. Since the mobile device 102 does not yet include an activation key, the AAA server 114e also should not include an activation key otherwise there is a mismatch between the information stored in the mobile device 102 and the one stored in the AAA server 114e.

If, however, the AAA server 114e includes an activation key, the self-provisioning gateway 114a informs the Wi-Fi access manager software that the network has an activation key for the mobile device 102. As a result, the Wi-Fi access manager software detects an activation key mismatch and attempts to resolve this mismatch as described in more detail with respect to FIG. 3. If the AAA server 114e does not include the activation key, the AAA server 114e informs the self-provisioning gateway 114a that the activation key for the provided MDN is set to null (215). The self-provisioning gateway 114a informs the Wi-Fi access manager software that the network does not have an activation key for the EVDO device (step 220). In response, the Wi-Fi access manager software creates a ten (10) digit alpha-numeric random string as the activation key (e.g., 123456) and stores the activation key in the mobile device.

The Wi-Fi access manager software causes the mobile device 102 to forward the generated activation key along with the MDN and ESN/MEID to the self-provisioning gateway 114a (step 225). The self-provisioning gateway 114a receives the activation key, MDN and ESN/MEID and conducts a security check to confirm that the MDN (e.g., MDN "B") provided by the Wi-Fi access manager software is associated with the IP address (e.g., IP address a.b.c.d) that the request is coming from. To this end, the self-provisioning gateway 114a provides the AAA serve 114e with the IP address (e.g., IP address a.b.c.d) from which the request is coming from and requests that the AAA server 114e identifies the MDN associated with the provided IP address (step 230). The AAA server 114e learns the IP address (e.g., IP address a.b.c.d) for the MDN (e.g., MDN "B") during the establishment of the EVDO/1X data connection that it authenticated and authorized.

The AAA server 114e forwards the MDN (e.g., MDN "B") associated with the IP address to the self-provisioning gateway 114a (step 235). Since the MDN received from the AAA server 114e matches the MDN received from the mobile 102, the security check is cleared. Thereafter, the self-provisioning gateway 114a uses the provisioning server 114c to provision the activation key to the AAA server 114e for the particular MDN. In particular, the self-provisioning gateway 114a requests that the provisioning server 114c sets the activation key (e.g., 123456) for the MDN ("B") (step 240). In response, the provisioning server 114c forwards the activation key and the MDN to the AAA server 114e and requests that the AAA server 114e provisions the MDN with the activation key (step 245).

The AAA server 114e records the activation key against the MDN and uses the activation key to generate a password for the mobile device 102. The password generated by the AAA server 114e is the result of combining several elements. The several elements may include the activation key, a synchornizable element, and the device or subscriber information. These elements may be hashed together to generate the password. The synchornizable element may include, for example, date, time, or a sequential counter. The device or subscriber information may include one or more of MDN, MIN, MEID, IMEI, IMSI, and ESN associated with the mobile device 102 or the EVDO device. In this manner, the password generated by the AAA server 114 is synchronized with the one generated by the Wi-Fi access manager software and can successfully be used to authorize and authenticate the mobile device access to a Wi-Fi network.

The AAA server 114e informs the provisioning server that the activation key has been recorded against the MDN (step 250). The provisioning server communicates the same to the self-provisioning gateway (step 255), which in turn informs the mobile device 102 (step 260). Upon receipt of such recordation, the Wi-Fi access manager software also records the activation key in the mobile device and reflects the status of the EVDO device from not initialized to initialized.

The mobile device 102 uses the activation key to generate a password used to authenticated the mobile device access to the Wi-Fi network. The key is hashed with other elements (e.g., other device or subscriber information) to generate the password. Since both the AAA server 114e and the mobile device 102 have the same activation key, they should be able to generate the same password which can be used to authenticate the mobile device 102 access request to the Wi-Fi network. After synchronization, the Wi-Fi access manager software causes the mobile device 102 to disconnect the EVDO/1X data session and if the trigger for this process had been a user attempting to access a local hotspot zone, the Wi-Fi access manger causes the mobile device to retry to connect to the local hotspot zone using the username and the newly generated password. In this manner, the user can automatically access the Wi-Fi network without having to manually enter a username or password.

In subsequent uses since the EVDO device is initialized and the activation key mapping to the device is present in the mobile device 102, the Wi-Fi access manager software uses the activation key for the device to generate the password for the local hotspot zone authentication. The Wi-Fi access manager software causes the mobile device 102 to forward the username and password to the local wireless hotspot server 110, which in turn forwards it to the Wi-Fi aggregator server 112. The Wi-Fi aggregator server 112 requests that the AAA server 114e authenticate the username and password. Since the AAA server 114e includes the same activation key, it should also generate the same password as the one generated by the mobile device 102. As such the result of the comparison should be a match and the mobile device access request should be granted.

Figure 3:
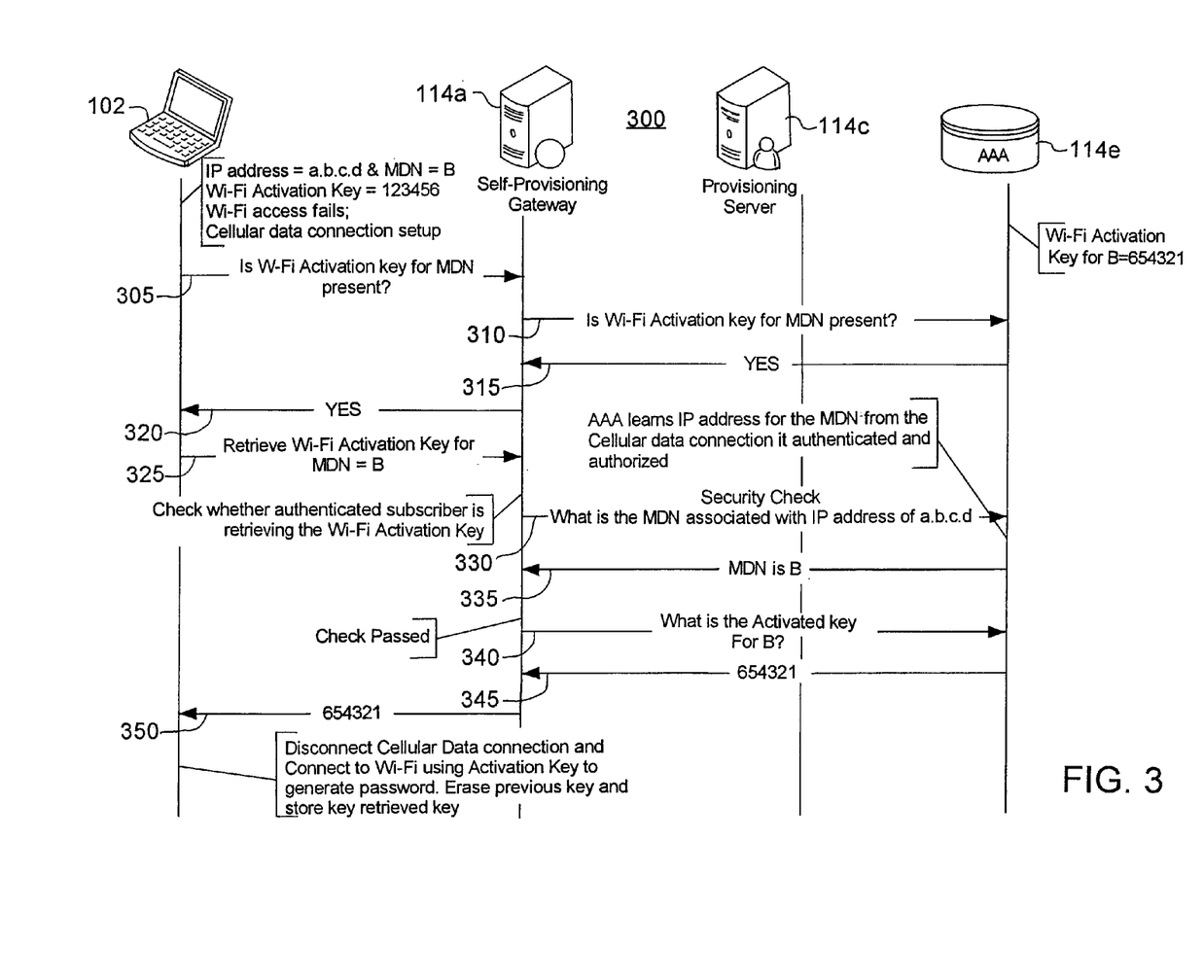
FIG. 3 illustrates exemplary process steps that may be taken if there is a mismatch between an activation key stored in a mobile device and the one stored in a AAA server.

FIG. 3 illustrates an exemplary process 300 that describes steps that may be taken if there is a mismatch between the activation key stored in the mobile device 102 and the one stored in the AAA server 114e. The actors shown in FIG. 1 perform the steps of the process 300. In particular, the process 300 involves the mobile device 102, the self-provisioning gateway 114a, the provisioning server 114c, and the AAA server 114e.

There might be some cases in which the EVDO device is used in multiple mobile devices so that the activation key in the Wi-Fi access manager software local database may not reflect the activation key in the AAA server 114e. As the activation key of the Wi-Fi access manager software is out of sync with the activation key of the AAA server 114e, the authentication will fail when the Wi-Fi access manager software causes the mobile device 102 to connect to the local wireless hotspot server 112. The Wi-Fi access manager software uses this error as an indication that the activation key may be out of sync and causes the mobile device 102 to set the first-time activation flag and to inform the customer that the EVDO/1X data session is needed for exchange of Wi-Fi credentials.

Consequently, the Wi-Fi access manager software causes the mobile device 102 to step up an EVDO/1X data session if it is possible to establish such a session. If EVDO/IX data coverage is available but a data session cannot be established, the customer may be informed to contact customer care and the user may be denied access to the Wi-Fi services offered by the local wireless hotspot server 110. If the EVDO/IX data coverage is available and the data session can be established, the Wi-Fi access manager software causes the mobile device 102 to query via https the self-provisioning gateway 114a to determine whether the AAA server 114e has an activation key associated with the mobile device 102 (step 305). The query may include the MDN and/or ESN/MEID of the mobile device 102. The self-provisioning gateway 114a queries the AAA server 114e on behalf of the mobile device 102 and reports the result of this query to the mobile device 102 (steps 310, 315). The self-provisioning gateway 114a may query the AAA server 114e directly as shown or may query the AAA server 114e via the provisioning server 114c.

The AAA server 114e determines whether it includes an activation key for the mobile device 102. The AAA server 114e may store the activation key against the MDN of the mobile device 102. As such, the AAA server 114e may be able to easily determine whether there is an activation key by referencing the MDN (e.g., MDN "B") of the mobile device 102. If the AAA server 114e does not have the activation key for the provided MDN, it informs the self-provisioning gateway 114a of the same, which in turn informs the mobile device 102. If the self-provisioning gateway 114a informs the mobile device 102 that the network does not have an activation key for the EVDO device, the Wi-Fi access manager software erases the activation key for the EVDO device from its local database and proceed with steps of the process 200 beginning with step 225 to establish a new activation key.

In this scenario, however, the AAA server 114e determines that it includes an activation key for the MDN of the mobile device 102 and informs the self-provisioning gateway 114c of the same (step 315). In turn, the self-provisioning gateway 114a informs the mobile device 102 that the network has an activation key for the mobile device 102 (step 320). As a result, the Wi-Fi access manager software causes the mobile device 102 to query via https the self-provisioning gateway 114*a* to find the provisioned activation key at the AAA server 114*e* (step 325). The self-provisioning gateway 114*a* receives the request from the mobile device 102 and conducts a security check to confirm that the authenticated subscriber is retrieving the provisioned activation key.

To this end, the self-provisioning gateway 114*a* provides the AAA serve 114*e* with the IP address (e.g., IP address a.b.c.d) from which the request is coming from and requests that the AAA server 114*e* identifies the MDN associated with the provided IP address (step 330). The AAA server 114*e* learns the IP address (e.g., IP address a.b.c.d) for the MDN (e.g., MDN "B") during the establishment of the EVDO/1X data connection that it authenticated and authorized.

The AAA server 114*e* forwards the MDN (e.g., MDN "B") associated with the IP address to the self-provisioning gateway 114*a* (step 335). Since the MDN received from the AAA server 114*e* matches the MDN received from the mobile device 102, the security check is cleared. Upon successful authentication, the self-provisioning gateway 114*a* forwards to the AAA server 114*e* the request from the mobile device 102 for the provisioned activation key (step 340). In response, the AAA server 114*e* provides the provisioned activation key to the self-provisioning gateway 114*a* (step 345), which forwards it to the mobile device 102 (step 350).

Upon receipt of the provisioned activation key, the Wi-Fi access manager software causes the mobile device 102 to record the activation key and to clear the first-time activation flag for the EVDO device. As noted previously, the mobile device 102 uses the activation key to generate a password used to authenticate the mobile device access to the Wi-Fi network. Since both the AAA server 114*e* and the mobile device 102 have now the same activation key, they can generate the same password which can be used to authenticate the mobile device 102 access request to the Wi-Fi network. After synchronization, the Wi-Fi access manager software causes the mobile device 102 to disconnect the EVDO/1X data session. If the trigger for this process had been a user attempting to access a local hotspot zone, the Wi-Fi access manger causes the mobile device 102 to retry to connect to the local hotspot zone using the username and the newly generated password. In this manner, the user can automatically access the Wi-Fi network without having to manually enter a username or password.

Figure 4:
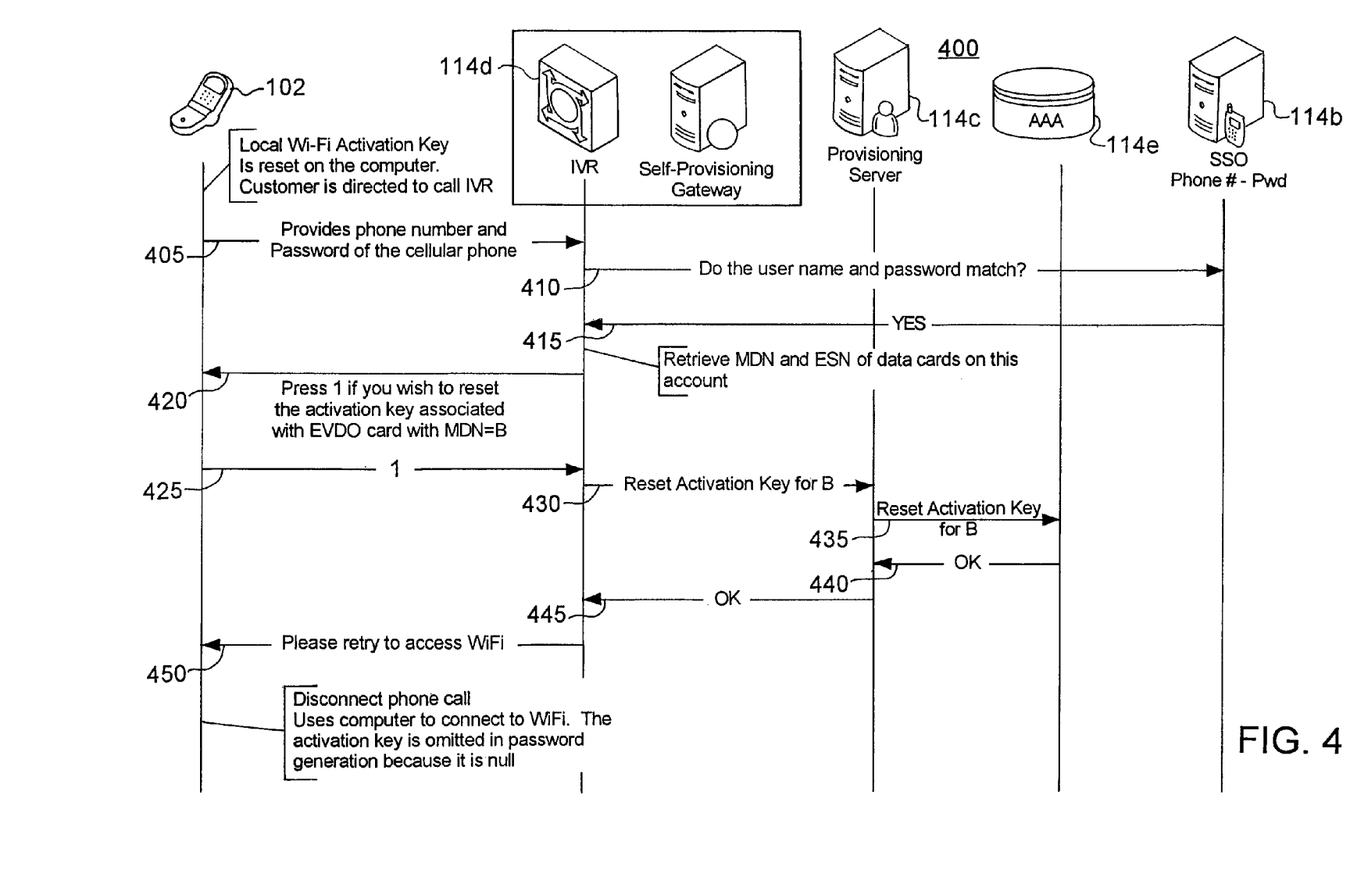
FIG. 4 illustrates an exemplary process enabling a user of a mobile device to invalidate an activation key stored in a AAA server.

FIG. 4 illustrates an exemplary process 400 enabling a user to invalidate an activation key stored in the AAA server. The actors shown in FIG. 1 perform the steps of the process 400. In particular, the process 400 involves the mobile device 102, the IVR 114*d*, the provisioning server 114*c*, the AAA server 114*e*, and the SSO server 114*b*.

The user may feel that the credentials have been compromised and may want to reset the credentials. For example, if the user loses his mobile device 102, he may want to reset the credentials stored in the AAA server 114*e*. To do so, the user utilizes the process 400. The process 400 begins with the user providing the IVR server 114*d* with the phone number and the password of the mobile device 102 (step 405). The IVR server 114*d* forwards the password and the phone number to the SSO server 114*b* to determine whether the username and password matches the username and password stored in the SSO server 114*b* (step 410). Upon confirming that the provided username and password match the credentials stored in the SSO server 114*b*, the SSO server 114*b* informs the IVR server 114*d* of the same (step 415).

At this point, the IVR server 114*d* retrieves the MDN and ESN of data cards associated with the provided username and password. In keeping with the previous example, the IVR server 114*d* retrieves the MDN "B" associated with the EVDO device included in the mobile device 102. The IVR server 114*d* then requests the user to press "1" if the user wishes to reset the activation key associated with the EVDO device having MDN "B" (step 420). The user then presses "1," which indicates to the IVR server 114*d* that the user wishes to reset the activation key for the EVDO device having MDN "B" (step 425). As a result, the IVR server 114*d* instructs the provisioning server 114*c* to reset the activation key stored in the AAA server 114*e* (step 430). The provisioning server 114 instructs the AAA server 114*e* to rest the activation key associated with MDN "B" (step 435). The AAA server 114*e* rests the activation key and informs the provisioning server 114*c* of the same (step 440). Thereafter, the provisioning server informs the IVR server 114*d* that the activation key has been reset (step 445), which will inform the mobile device 102 to retry access Wi-Fi network (step 450).

Figures 5, 6:
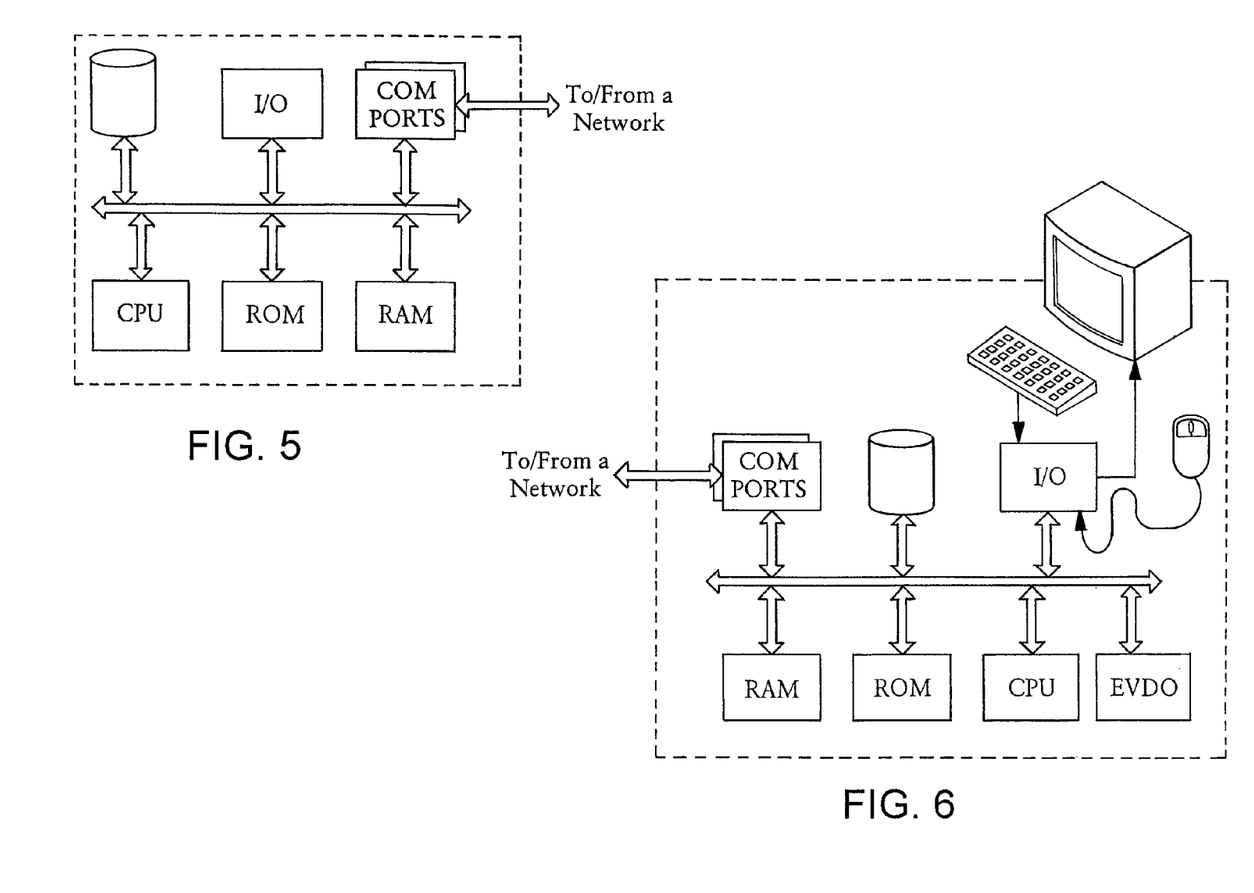
FIG. 5 is a simplified functional block diagram of a computer that may be configured as a host or server.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station, although computer of FIG. 6 may also act as a server if appropriately programmed.

In one example, the computer of FIG. 6 may act as a self provisioning gateway 114*a* to the processing functions related to the enabling the mobile device 102 to seamlessly access the Wi-Fi network. The self provisioning gateway 114*a* may be implemented using one or more hardware platforms intended to represent a general class of data processing device commonly used to run "server" programming so as to implement the functions discussed above. Such a device typically utilizes general purpose computer hardware to perform its respective server processing and to control the attendant communications via the network(s). A server, for example, includes a data communication interface for packet data communication. The server also includes a central processing unit ("CPU"), in the form of one or more processors, for executing program instructions.

The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

In another example, the computer of FIG. 6 may act as the AAA server 114*e* and may be configured to authenticate the mobile device 102 access to the Wi-Fi network. In yet another example, the computer of FIG. 6 may act as a mobile device 102. To this end, the computer of FIG. 6 includes an EVDO device and access manager software that enable the mobile device to generate password, synchronize the generated password with the one generated by the AAA server 114*e* via an EVDO session, and subsequently use the generated password to gain access to the Wi-Fi network.

Hence, aspects of the methods for enabling a seamless access to a Wi-Fi network outlined above may be embodied in programming. Program aspects of the technology may be thought of as "products" or "articles of manufacture" typically in the form of executable code and/or associated key and password data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from a computer or processor into an appropriate server or loading the access manager software into the mobile device. Another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency ("RF") and infrared ("IR") data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated key or password data to a processor for execution and/or data processing.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Other implementations are contemplated. For example, if, EVDO/1X coverage is not available and the customer is attempting to access the local wireless hotspot server, the Wi-Fi access manager software proceeds with a zero-length string as the activation key. The Wi-Fi access manager software generates the password and forwards the password along with the username to the local wireless hotspot server 110.

The local wireless hotspot server 110 recognizes that the mobile device 102 is associated with the Wi-Fi aggregator server network 112 and, as such, forwards the username and password to the Wi-Fi aggregator server 112. The Wi-Fi aggregator server forwards the username and password to the AAA server 114e. The AAA server 114e uses the username to determine an activation key for the mobile device 102. However, since the activation key is set to null, the AAA server 114e proceeds with generating the password using also a zero-length string as the activation key. In this manner, the AAA server 114e generates the same password as the one generated by the mobile device 102 and authenticates the mobile device access to the Wi-Fi network.

What is claimed is:

1. A method for enabling a seamless authenticated access to an Aggregator's Wi-Fi network by automatic generation and synchronization of keys with a public mobile service provider network, the method comprising steps of:
   receiving, from a mobile device and at the public mobile service provider network, a request to establish a data session with a server of the public mobile service provider network to enable the mobile device to access the Aggregator's Wi-Fi network for a first time;
   authenticating the mobile device in response to the request to establish the data session;
   establishing the data session with the mobile device upon successful authentication;
   upon establishing the data session, receiving an activation key associated with the mobile device from the mobile device and at the public mobile service provider network;
   recording, at the public mobile service provider network, the activation key against an identification of the mobile device;
   upon recording, at the public mobile service provider network, the activation key against the identification of the mobile device, sending, to the mobile device via the public mobile service provider network, a response indicating the recording of the activation key;
   responsive to the response indicating the recording of the activation key, receiving a disconnection request from the mobile device via the public mobile service provider network;
   disconnecting the established data session in response to the disconnection request;
   using the recorded activation key to generate, in an authentication server of the public mobile service provider network, a server-generated password for authenticating the mobile device for access to the Aggregator's Wi-Fi network;
   receiving, from a local server of the Aggregator's Wi-Fi network and at the public mobile service provider network, a request to authenticate the mobile device to enable the mobile device to access the Aggregator's Wi-Fi network subsequent to the disconnection of the established data session, the request to authenticate the mobile device including a device-generated password generated in the mobile device; and
   responsive to the received request from the local server, using the server-generated password to authenticate the mobile device to access the Aggregator's Wi-Fi network based on determining whether the server-generated password matches the device-generated password.

2. The method of claim 1, wherein the request to establish the data session from the mobile device is based on a first-time activation of Wi-Fi access client software executable at the mobile device.

3. The method of claim 1, further comprising:
receiving from the mobile device a query for the activation key associated with the mobile device, wherein the query is received prior to the step of receiving the activation key from the mobile device.

4. The method of claim 3, further comprising:
responsive to the received query from the mobile device, sending to the mobile device an indication of whether or not the public mobile service provider network includes an activation key associated with the mobile device.

5. The method of claim 1, wherein the activation key includes a random number or a random alphanumeric string.

6. The method of claim 1, further comprising:
receiving, from the mobile device and at the public mobile service provider network, instructions to erase the activation key associated with the mobile device;
authenticating, in response to the instructions to erase the activation key, an identity of a user of the mobile device or the mobile device; and
erasing the activation key associated with the mobile device upon successful authentication.

7. The method of claim 6, further comprising:
receiving, from the mobile device and at the public mobile service provider network, a new activation key associated with the mobile device; and
recording the new activation key against the identification of the mobile device.

8. The method of claim 1, further comprising a step of determining whether the mobile device subscribes to Wi-Fi services at the public mobile service provider network based on the authentication information gathered during the establishment of the data session, wherein recording the activation key includes recording the activation key after determining that the mobile device subscribes to the Wi-Fi services.

9. The method of claim 1, wherein the activation key received from the mobile device is randomly generated by the mobile device.

10. The method of claim 1, wherein the device-generated password is generated in the mobile device using the activation key.

11. The method of claim 1, wherein the activation key is generated in the mobile device, and wherein the request including the activation key is received from the mobile device as part of an operation to synchronize the activation key generated in the mobile device with the activation key recorded against an identification of the mobile device at the public mobile service provider network.

12. The method of claim 1, further comprising:
receiving, from the local server of the Aggregator's Wi-Fi network and at the public mobile service provider network, a request from a second mobile device to authenticate the second mobile device for enabling the second mobile device to access the Aggregator's Wi-Fi network;
responsive to the received request from the local server, determining there is no activation key associated with the second mobile device at the public mobile service provider network;
upon determining there is no activation key associated with the second mobile device at the public mobile service provider network, generating at the public mobile service provider network a second server-generated password using a zero-length activation key; and
using the second server-generated password to authenticate the second mobile device to access the Aggregator's Wi-Fi network based on determining whether the second server-generated password matches a second password submitted by the second mobile device to the Aggregator's Wi-Fi network, the second password being generated using the zero-length activation key.

13. An article of manufacture comprising a tangible non-transitory computer-readable storage medium and a computer program for enabling a mobile device to automatically access a Wi-Fi network by automatic generation and synchronization of keys with a public mobile service provider network, the computer program being embodied on the computer-readable storage medium and including instructions that, when executed, cause the mobile device to:
establish a data session with a server of a public mobile service provider network;
determine whether the public mobile service provider network includes an activation key associated with the mobile device over the established data session;
upon determination that the public mobile service provider network does not include the activation key for the mobile device or that a first-time activation flag is set, send to a server of the public mobile service provider the activation key for storage against an identification of the mobile device;
upon receipt of an indication that the server of the public mobile service provider network has recorded the activation key, send a disconnection request to the server to disconnect the established data session;
use the activation key to generate in the mobile device a password for authentication of access to the Wi-Fi network;
send the generated password from the mobile device to a local server of the Wi-Fi network for access to the Wi-Fi network based on authentication of access to the Wi-Fi network by the server of the public mobile service provider network subsequent to the disconnection of the established data session; and
access the Wi-Fi network upon being authenticated for access by the local server of the Wi-Fi network based on whether the password generated in the mobile device matches a password generated in an authentication server of the public mobile service provider network.

14. The article of manufacture according to claim 13, wherein the first-time activation flag indicates that the activation key for the mobile device is uninitialized.

15. The article of manufacture according to claim 13, wherein the mobile device includes a mobile phone or a laptop.

16. The article of manufacture according to claim 13, wherein the identification of the mobile device includes a Mobile Directory Number associated with the mobile device.

17. The article of manufacture according to claim 13, wherein the activation key is an alpha-numeric random string.

18. The article of manufacture according to claim 13, wherein the computer-readable medium further includes instructions to cause the mobile device to send the identification of the mobile device to the server of the public mobile service provider network as a username.

19. The article of manufacture according to claim 13, wherein the computer-readable medium further includes instructions to cause the mobile device to automatically send the password along with a username to the local server of the Wi-Fi network upon determination that the mobile device desires to access the Wi-Fi network.

20. The article of manufacture according to claim 13, wherein the computer program further includes instructions to cause the mobile device to:

send, from the mobile device and to the server of the public mobile service provider network, an instruction to erase the activation key associated with the mobile device;

send, from the mobile device and to the server of the public mobile service provider network, a new activation key associated with the mobile device; and record the new activation key in the mobile device.

21. The article of manufacture according to claim 13, wherein the computer program further includes instructions to cause the mobile device to generate the activation key prior to sending the request to the server of the public mobile service provider network.

22. The article of manufacture according to claim 13, wherein the password generated in the authentication server is generated using the activation key sent to the server of the public mobile service provider network in the request to establish the data session.

\* \* \* \* \*